United States Patent
Eyada

(10) Patent No.: US 11,729,146 B1
(45) Date of Patent: *Aug. 15, 2023

(54) NETWORK SEGMENTATION BY SECURITY GROUPS

(71) Applicant: Amazon Technologies, Inc., Seattle, WA (US)

(72) Inventor: Hatem Eyada, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/579,002

(22) Filed: Jan. 19, 2022

Related U.S. Application Data

(63) Continuation of application No. 16/213,089, filed on Dec. 7, 2018, now Pat. No. 11,240,203.

(51) Int. Cl.
*H04L 9/40* (2022.01)

(52) U.S. Cl.
CPC ...... *H04L 63/0263* (2013.01); *H04L 63/0272* (2013.01); *H04L 63/104* (2013.01); *H04L 63/20* (2013.01)

(58) Field of Classification Search
CPC ............ H04L 63/0263; H04L 63/0272; H04L 63/104; H04L 63/20
See application file for complete search history.

(56) References Cited

U.S. PATENT DOCUMENTS

| 9,112,777 | B1 | 8/2015 | Barclay et al. |
| 9,916,545 | B1 | 3/2018 | de Kadt et al. |
| 10,142,290 | B1 | 11/2018 | Brandwine et al. |
| 10,484,334 | B1 * | 11/2019 | Lee .......................... H04L 67/30 |

(Continued)

FOREIGN PATENT DOCUMENTS

WO 2019121677 A1 6/2019

OTHER PUBLICATIONS

AWS Documentation, "Amazon EC2 Security Groups for Linux Instances", https://docs.aws.amazon.com/AWSEC2/latest/UserGuide/using-network-security.html, 15 pages, [retrieved from the internet on: Mar. 11, 2019] (Year: 2019).

(Continued)

*Primary Examiner* — William S Powers
(74) *Attorney, Agent, or Firm* — Lowenstein Sandler LLP

(57) ABSTRACT

A method of automatic security group generation by a firewall management service. The method may include receiving a security policy definition allowing cloud resource instances labeled by a first tag to communicate to cloud resource instances labeled by a second tag; creating a first security group comprising an inbound firewall rule for the cloud resource instances associated with the first tag, wherein the inbound firewall rule specifies cloud resource instances associated with a second security group as source communication endpoints; creating a second security group comprising an outbound firewall rule for the cloud resources instances associated with the second tag, wherein the outbound firewall rule specifies cloud resource instances associated with the first security group as destination communication endpoints; and causing a firewall service to implement the first security group and the second security group.

20 Claims, 7 Drawing Sheets

(56) References Cited

U.S. PATENT DOCUMENTS

| | | | |
|---|---|---|---|
| 10,528,627 B1 | 1/2020 | Dunsmore | |
| 10,628,144 B2 | 4/2020 | Myneni et al. | |
| 10,721,141 B1* | 7/2020 | Verma | H04L 41/5054 |
| 10,735,263 B1* | 8/2020 | McAlary | H04L 41/5054 |
| 2010/0251339 A1 | 9/2010 | McAlister | |
| 2012/0117571 A1 | 5/2012 | Davis et al. | |
| 2013/0132545 A1* | 5/2013 | Schultze | G06F 9/5077 709/223 |
| 2017/0289107 A1* | 10/2017 | Plichta | H04L 63/308 |
| 2017/0373860 A1* | 12/2017 | Kshirsagar | H04L 67/02 |
| 2018/0088964 A1* | 3/2018 | Hussain | G06F 9/5061 |
| 2019/0171966 A1 | 6/2019 | Rangasamy | |
| 2019/0349357 A1* | 11/2019 | Shukla | H04L 63/20 |
| 2020/0014662 A1 | 1/2020 | Chanda et al. | |
| 2020/0059492 A1 | 2/2020 | Janakiraman et al. | |

OTHER PUBLICATIONS

AWS Documentation, "What is VPC Peering?", https://docs.aws.amazon.com/vpc/latest/peering/what-is-vpc-peering.html, 2 pages, [retrieved from the internet on: Mar. 11, 2019] (Year: 2019).

AWS Documentation, "Security Groups for Your VPC", https://docs.aws.amazon.com/vpc/latest/userguide/VPC_SecurityGroups.html, 14 pages, [retrieved from the internet on: Mar. 11, 2019] (Year: 2019).

AWS Documentation, "What Are AWS WAF, AWS Shield, and AWS Firewall Manager?", https://docs.aws.amazon.com/waf/latest/developerguide/what-is-aws-waf.html, 3 pages, [retrieved from the internet on: Mar. 11, 2019] (Year: 2019).

AWS Documentation, "Flow AWS WAF Works", https://docs.aws.amazon.com/waf/latest/developerguide/how-aws-waf-works.html, 5 pages, [retrieved from the internet on: Mar. 11, 2019] (Year: 2019).

USPTO, Office Action for U.S. Appl. No. 16/213,089, dated Nov. 3, 2020.

USPTO, Final Office Action for U.S. Appl. No. 16/213,089, dated Apr. 15, 2021.

USPTO, Advisory Action for U.S. Appl. No. 16/213,089, dated Jul. 30, 2021.

USPTO, Notice of Allowance for U.S. Appl. No. 16/213,089, dated Sep. 29, 2021.

* cited by examiner

| Tag domain 510 | User role 520 |
|---|---|
| 512 fms-* | 522 FMS service-linked role |
| 514 fms-<account_id>-* | 524 FMS account administrator |
| 516 fms-<OU_id>-<account_id->* | 526 OU administrator |
| 518 fms-<organization_id>-* | 528 Organization administrator |

Fig. 5

NETWORK SEGMENTATION BY SECURITY GROUPS

RELATED APPLICATIONS

This application is a continuation of U.S. patent application Ser. No. 16/213,089 filed on Dec. 7, 2018, which is incorporated by reference herein.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding.

FIG. 5 schematically illustrates an example resource tagging policy implemented by the cloud management service.

DETAILED DESCRIPTION

Figure 1:
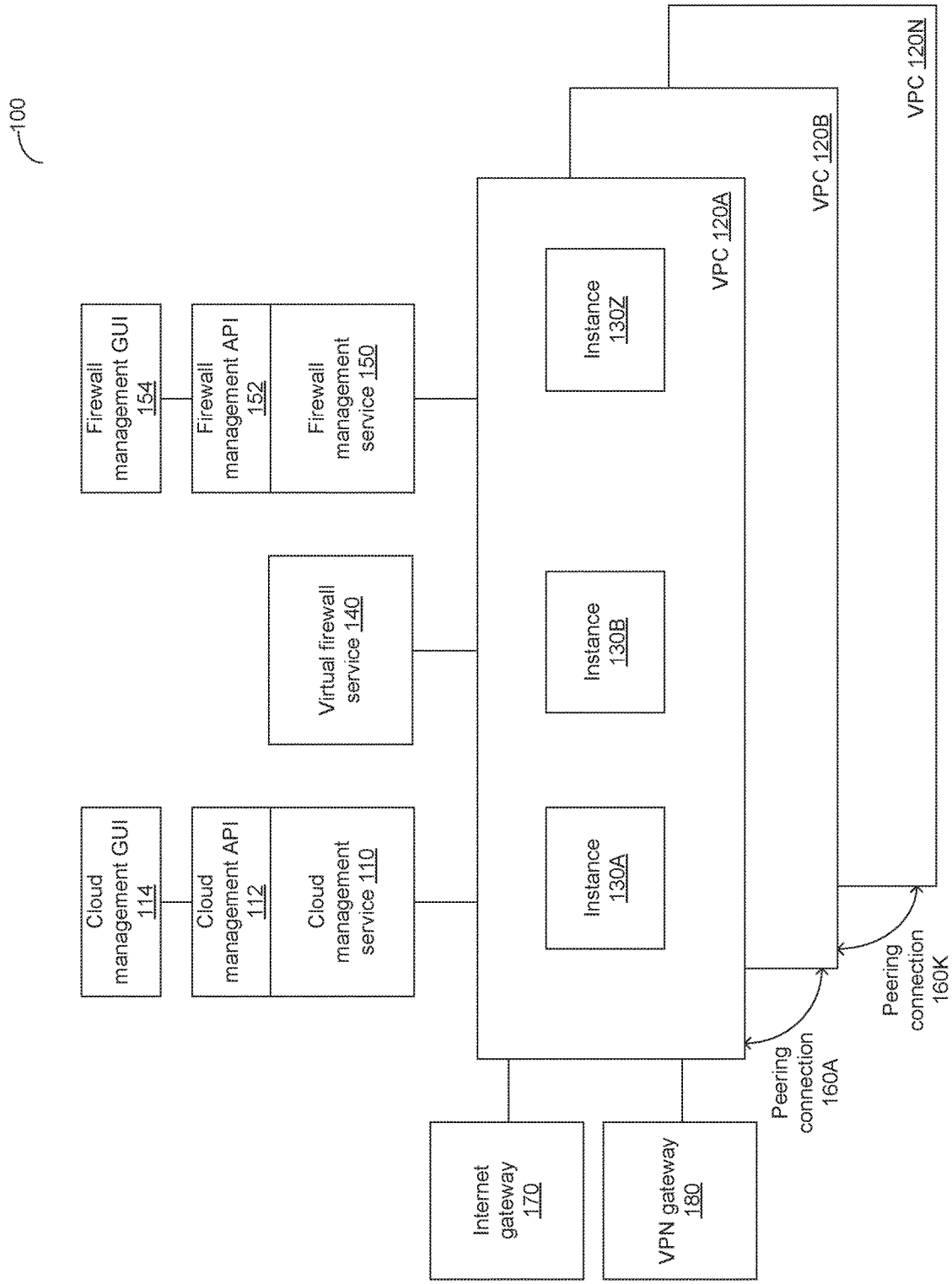
FIG. 1 schematically illustrates one embodiment of a cloud infrastructure, in which systems and methods described herein may operate.

Described herein are systems and methods for network segmentation in virtual private clouds by automatically generated security groups. Network segmentation herein shall refer to creating logical network segments, such that the network traffic flowing between a pair of such logical network segments is managed by sets of firewall rules specified by the security groups associated with respective logical network segments.

An example cloud service may provide scalable computing capacity, e.g., in the form of virtual computing environments (such as virtual machine instances or containers), which are referred herein as "instances." The instances may be grouped into one or more logically isolated sections, which are referred herein as "virtual private clouds" (VPCs). A VPC may include one or more private networks associated with private or public Internet Protocol (IP) address ranges and interconnected by one or more virtual gateways. In an illustrative example, a VPC may include an Internet-facing subnet to which one or more web server instances are connected, and may further include a private subnet (having no Internet access) for interconnecting the web server instances with database server instances. Access to the instances may be selectively controlled by one or more virtual firewalls managed by the firewall management service.

In an illustrative example, a cloud service customer may have a large number (e.g., thousands) of instances provisioned in one or more VPCs. Due to the large number of instances, managing the security of intra-cloud communications (within one VPC or within multiple VPCs) thus becomes an acute problem, since the number of possible connections between customer's instances grows exponentially with the number of instances. Thus, the security of intra-cloud communications is often effectively ignored by networking configurations which, relying solely upon the perimeter protection of the cloud environment, would impose minimal, if any, restrictions on communications within the private cloud which may include one or more VPCs. Accordingly, having gained network access to one instance, a malicious party would be able to freely communicate to and further compromise multiple other instances running with the same customer network encompassing one or more VPCs.

Implementations of the present disclosure address the above-noted and other deficiencies by providing systems and methods of network segmentation, which involves automatically generating firewall rules by applying pre-configured security policies to all instances based on the tags indicating their respective functions, resource types, or application types. The automatically generated security groups would thus effectively segment the customer network encompassing one or more VPCs into multiple logical network segments that facilitate legitimate intra-cloud communications (i.e., communications that have been "whitelisted" by the firewall rules) while preventing any other communications within the same VPC or across multiple VPCs, as described in more detail herein below.

Therefore, the systems and methods described herein improve the security and scalability of virtual private clouds, by relieving the network administrators from mundane tasks of manually defining logical network segments and associated firewall rules (the number of which may grow exponentially with the number instances in a customer's network). The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation.

FIG. 1 schematically illustrates one embodiment of a cloud infrastructure, in which systems and methods described herein may operate. As shown in FIG. 1, the cloud infrastructure 100 managed by the cloud management service 110 may include multiple virtual private clouds 120A-120N, which implement virtual networks associated with customers' cloud accounts. The cloud management service 110 may export an application programming interface (API) 112 through which it may receive cloud configuration parameters, cloud management commands, and/or notifications from various cloud components. In one embodiment, the cloud management service 110 may further support a graphical user interface (GUI) 114 for interactively receiving cloud configuration parameters and/or cloud management commands.

Each VPC is logically isolated from other virtual networks in the cloud, such logical isolation being enforced by network configuration and routing tables. Each VPC may include one or more virtual computing environments (such as virtual machine instances or containers), which are referred herein as "instances" 130A-130Z. Each instance may be connected to one or more network segments associated with private or public Internet Protocol (IP) address ranges and interconnected by one or more virtual gateways. Access to the instances may be selectively control by one or more virtual firewalls 140 managed by the firewall management service 150. The firewall management service 150 may export an API 152 through which it may receive security policy definitions, network configuration parameters, commands, or notifications. In one embodiment, the firewall management service 150 may further support a GUI 154 for interactively receiving security policy definitions, network configuration parameters and/or commands.

At least some of the VPCs 120A-120N may be interconnected by VPC peering connections 160A-160K. A VPC peering connection interconnecting a pair of VPCs allows instances residing within one VPC communicate to instances residing within another VPC of the interconnected pair of VPCs.

At least some of the VPCs 120A-120N may be interconnected with an Internet gateway 170, through which at least a subset of instances 130A-130Z (as defined by the routing tables and firewall rules) may communicate to the Internet. In one embodiment, a VPC may be connected to the customer's corporate network via a virtual private network (VPN) connection which is facilitated by a VPN gateway 180 and a customer gateway in communication with the customer's corporate network (not shown in FIG. 1).

In an illustrative example, the firewall management service 150 of FIG. 1 may generate, based on a security policy specified by the customer, a set of firewall rules applicable to a given instance 130A-130Z. A set of firewall rules may include inbound rules (i.e., rules defining the network traffic that is permitted to reach the instance) and outbound rules (i.e., rules defining the permitted outbound network traffic that is initiated by the instance).

An inbound rule may specify a source network address (or a range of network addresses), a transport layer protocol (e.g., Transport Control Protocol (TCP) or User Datagram Protocol (UDP)), and a port. Such an inbound rule would be interpreted as allowing the instance to which the rule is applied to receive network packets originated by the hosts whose network addresses match the specified network address range, provided that the network packets are addressed to a process running on the given instance and listening on the specified port of the specified transport layer protocol (e.g., TCP ports 80 and 443 for incoming HTTP/HTTPS connections).

Conversely, an outbound rule may specify a destination network address (or a range of network addresses), a transport layer protocol (e.g., TCP or UDP), and a port; such an outbound rule would be interpreted as allowing the given instance to transmit network packets addressed to the hosts whose network addresses match the specified network address range, provided that the network packets are addressed to the specified port of the specified transport layer protocol (e.g., TCP ports 80 and 443 for outgoing HTTP/HTTPS connections).

Any network packet that does not match any firewall rules will be dropped by the virtual firewall, and thus will not reach its destination. Therefore, the firewall rules may be viewed as "white lists" of permitted connections.

In one embodiment, the firewall service may perform stateful packet filtering, such that the action to be performed with respect to an inspected network packet would be defined not only by the active firewall rules, but also by the stored state (i.e., history) of communications of the given instance. In an illustrative example, if an incoming packet addressed to a web server listening on port 80 of the local instance was permitted according to a specified inbound rule, the response packet transmitted by the local instance to the requester will also be permitted by the firewall service irrespective of outbound rules, thus relieving the customer from the task of defining the symmetric firewall rule for response packets. Conversely, if an outgoing packet addressed to a web server listening on port 80 of a remote host was permitted according to a specified outbound rule, the response packet transmitted by the remote host to the local instance will also be permitted by the firewall service irrespective of inbound rules, thus relieving the customer from the task of defining the symmetric firewall rule for response packets.

A set of firewall rules may be associated with one or more instances running within the customer's cloud encompassing one or more VPCs. A list of instances and a set of associated firewall rules may be referred as a "security group." A security group definition may identify the instances by their respective tags. "Tag" herein shall refer to a label that may be assigned to a cloud resource (e.g., to a running instance). Such a tag may include a key and an optional value, both of which may be defined by the cloud customer. Thus, tagging enables categorization of cloud resources, e.g., by owner, function, environment, etc. A set of tag keys may be defined for each cloud resource type. Tags can be assigned to cloud resources using any suitable administrative interface, such as an API or an administrative console. In one embodiment, the tag space may be divided into sub-domains, such that each sub-domain would be restricted to specific user roles, as described in more detail herein below.

In one embodiment, the destination field of a firewall rule associated with a security group may be specified by referencing another security group, rather than by using a network address or a network address range. This mechanism may be leveraged for the network segmentation, which involves automatically generating firewall rules by applying pre-configured security policies to all instances based on the tags indicating their respective functions, resource types, or application types. The automatically generated security groups would thus effectively segment the customer network encompassing one or more VPCs into multiple logical network segments that facilitate legitimate intra-cloud communications while preventing any other communications within the same VPC or across multiple VPCs.

Enforcing the security policy implemented by the security groups may further involve preventing any customer account users from associating any automatically generate security groups with any instances as well as from disassociating any automatically generated security groups from any instances. This may be achieved by labeling the automatically generated security groups with a service-reserved tag, reserving a security group name sub-domain for the automatically generated security groups, and/or implementing other access control attributes to be relied upon by an access control policy.

Figure 2:
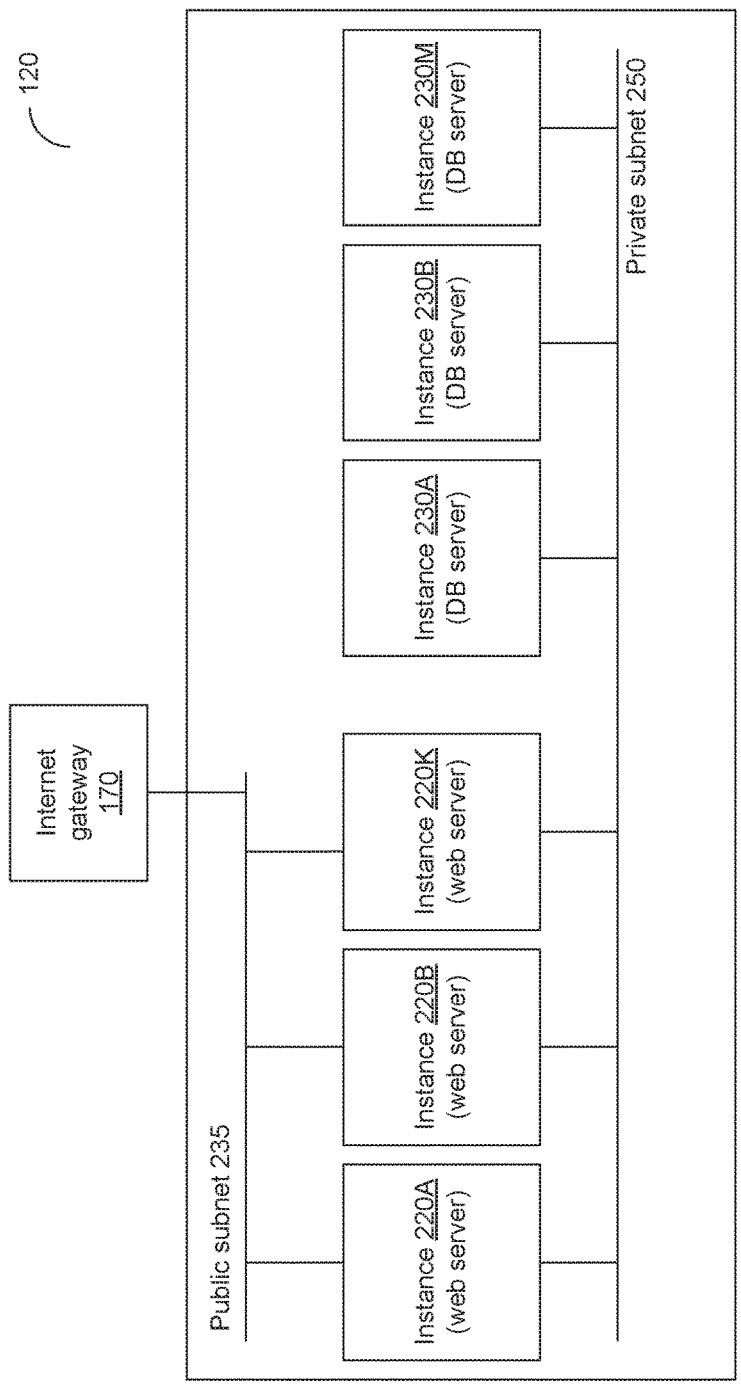
FIG. 2 schematically illustrates an example virtual private cloud implemented in accordance with one embodiment.

As schematically illustrated by FIG. 2, an example VPC 120 may include one or more instances 220A-220K running one application (e.g., a web server) and may further include one or more instances 230A-230M running another application (e.g., a MySQL database server). The web server instances 220A-220K may be connected to the Internet via the public subnet 235 and Internet gateway 170 and, responsive to receiving HTTP requests from external HTTP clients may compile and transmit queries to the database server instances via a private subnet 250; the database server responses may be parsed and utilized for compiling HTTP responses to be returned to the HTTP clients.

The customer's network administrator may configure, via a suitable administrative interface, such as the firewall management GUI 154 of FIG. 1, inbound and outbound security policies that specify client-side hosts/endpoints referenced by the respective tags, server-side hosts/endpoints referenced by the respective tags, transport layer protocols and ports on which the network traffic should be allowed.

In the illustrative example of FIG. 2, the security policy would allow web server instances 220A-220K (labeled by a pre-defined tag indicating the function, resource type, or application type, such as "function=web server") to communicate to database server instances 230A-230M (labeled by a pre-defined tag indicating the function, resource type, or application type, such as "function=db_server") listening on TCP port 3306, while preventing any other communications within the VPC 120.

The security policy may further specify that the web server instances 220A-220K should be accessible by any external client over the Internet. However, since the systems and methods of the present disclosure focus on communications within the customer clouds, implementations of the security policy allowing external client access to the web server instances 220A-220K fall outside of the scope of the present disclosure.

Conversely, the security policy allowing web server instances 220A-220K to communicate to database server instances 230A-230M listening on TCP port 3306, while preventing any other communications within the VPC 120 may be implemented by creating two security groups, referred herein as "web security group" (WSG) 302 and "database security group" (DSG) 304. All existing or newly created web server instances 220A-220K are associated with the WSG (as shown by the dotted line 306), while all existing or newly created database server instances 230A-230M are associated with the DSG (as shown by the dotted line 308).

The DSG has an inbound rule 312 for TCP port 3306 and is created with an empty Source field 314. The WSG has an outbound rule 322 for TCP port 3306 and is created with an empty Destination field 324. Then, as schematically shown by the dotted line 342, DSG is specified as the destination (324) for the outbound rule 322 of the WSG, and thus all instances associated with the DSG become valid destinations for the outbound rule of WSG. Conversely, as schematically shown by the dotted line 344, WSG is specified as the source (314) for the inbound rule 312 of the DSG, and thus all instances associated with the WSG become valid sources for the inbound rule of DSG.

Figure 3:
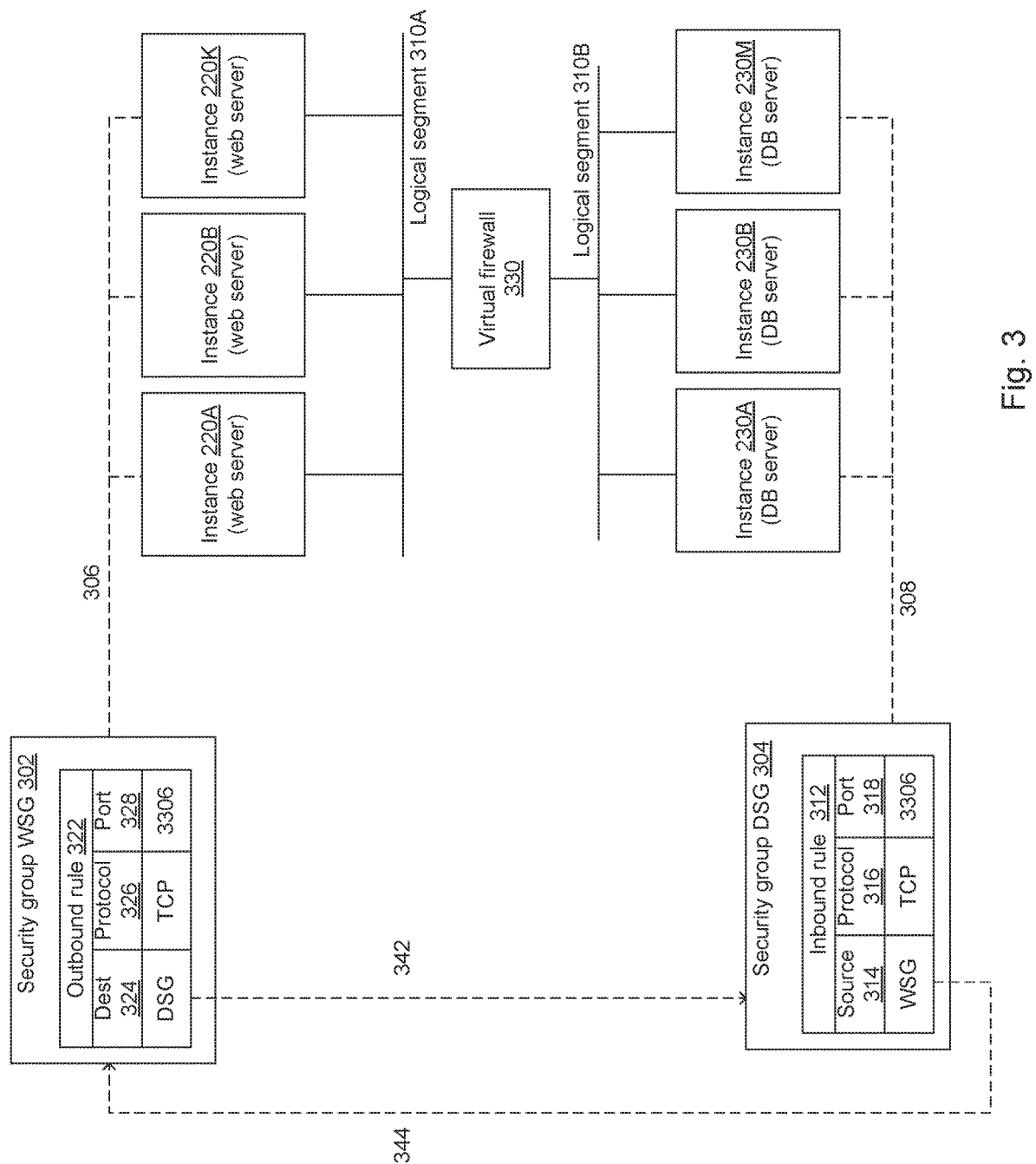
FIG. 3 schematically illustrates logical segmentation of the private subnet of an example virtual private cloud by security groups implemented in accordance with one embodiment.

Thus, as schematically illustrated by FIG. 3, the two security groups, WSG and DSG, effectively segment the private subnet of the VPC 120 into two logical segments 310A and 310B interconnected via a virtual firewall 330, which implements the firewall rules associated with the WSG and DSG. The virtual firewall 330 may be implemented by the virtual firewall service 140 of FIG. 1. While the virtual firewall divides the logical network segments 310A and 310B, the hardware implementing the virtual firewall (such as filtering routers and/or layers 2 and 3 switches) may reside anywhere on the physical network servicing the VPCs within which the instances 220-230 are running.

Each security group generated by the firewall management service may be assigned a unique identifier, which other components of the cloud infrastructure may utilize to reference the security group. In particular, the security group identified is used to reference one security group as the destination of the outbound firewall rule (or as the source of the inbound firewall rule) of another security group. A fully-qualified security group identifier may be represented by a combination of the account identifier, VPC identifier, and a local identifier of the security group.

Collectively, the two sets of rules would allow any web server instance 220A-220K to send requests to and receive responses from any database server instance 230A-230M, while preventing any other communications within the VPC 120. The firewall rules of the security groups are enforced by the virtual firewall 330 (which may be implemented by the virtual firewall service 140 of FIG. 1). In one embodiment, the virtual firewall may interpret each firewall rule and substitute the endpoint tags with their respective IP addresses, and may thus utilize the set of rules for filtering the network traffic routed through the firewall. In another embodiment, the network traffic router through the firewall may include metadata specifying the tags assigned to the cloud resources, and thus the virtual firewall service may perform the packet inspection based on the tags instead of the actual IP addresses. For each network packet, the firewall makes a decision to allow the packet if the packet header fields (source or destination, protocol, and port) match at least one active firewall rule; otherwise, the packet would be dropped by the firewall.

As noted herein above, the firewall service performs stateful packet filtering. Accordingly, if an incoming packet addressed to a database server listening on port 3306 of a database server instance 230A-230M was permitted according to the specified inbound rule of the DSG, the response packet transmitted by the database server instance to the requesting web server instance will also be permitted by the firewall service irrespective of outbound rules, thus relieving the customer from the task of defining the symmetric firewall rule for response packets. Conversely, if an outgoing packet addressed to a database server listening on port 3306 of a database server instance 230A-230M was permitted according to the specified outbound rule of the WSG, the response packet transmitted by the database server instance to the requesting web server instance will also be permitted by the firewall service irrespective of inbound rules, thus relieving the customer from the task of defining the symmetric firewall rule for response packets.

While in the illustrative example of FIG. 2 the web server instances 220A-220K and the database server instances 230A-230N reside within the same VPC 120, in another illustrative example, the above-described security policies WSG and DSG may be implemented for web server instances 220A-220K residing within one VPC and database server instances 230A-230N residing within another VPC, provided that the two VPCs are connected by an active VPC peering connection, resulting in the same logical segmentation illustrated by FIG. 3.

While the illustrative example of FIG. 2 described web server instances 220A-220K and the database server instances 230A-230N, similar security policy may be formulated for any two or more functional groups of instances, such any instance of one functional group would be allowed to communicate to any instance of another functional group, while any other communications within the customer cloud encompassing one or more VPCs would be prevented by the firewall service.

The customer's network administrator may configure, via a suitable administrative interface, such as the firewall management GUI 154 of FIG. 1, inbound and outbound security policies that specify client-side instances referenced by their respective tags, server-side instances referenced by their respective tags, transport layer protocols and ports on which the network traffic should be allowed. The security policy would allow client instances (labeled by one pre-defined tag indicating the function, resource type, or application type) to communicate to server instances (labeled by another pre-defined tag indicating the function, resource type, or application type) listening on a specified TCP or UDP port, while preventing any other communications within the customer's cloud encompassing one or more VPCs.

Figure 4:
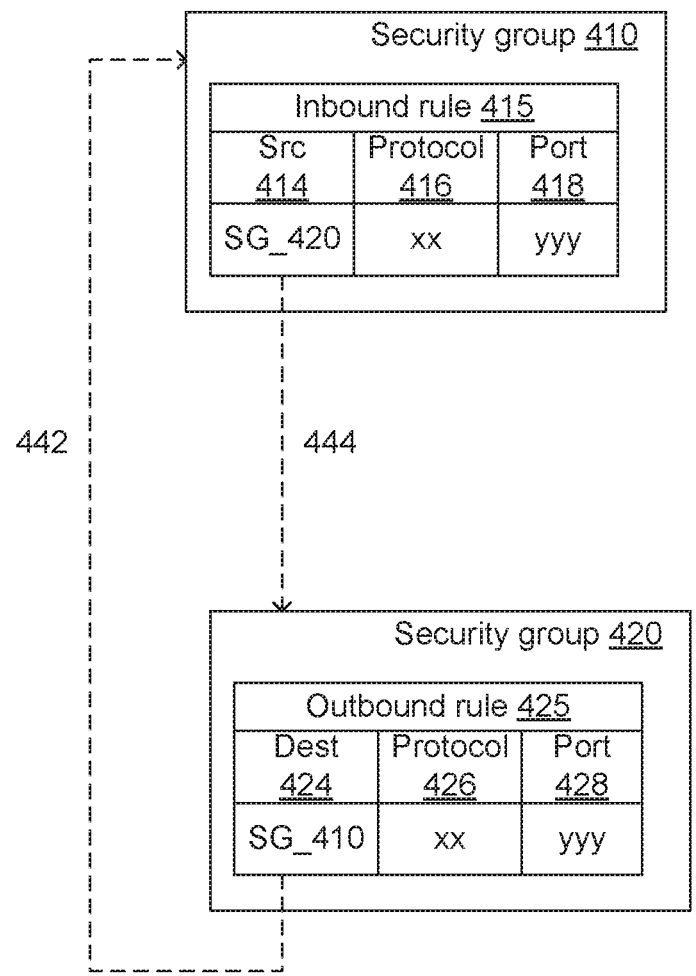
FIG. 4 schematically illustrates an example structure of security groups generated for performing network segmentation in accordance with one embodiment.

As schematically illustrated by FIG. 4, the security policy may be implemented by creating two security groups: security group 410 associated with all active or newly created server-side instances and security group 420 associated with all active or newly created client-side instances. The security group 410 includes an inbound firewall rule 415 specifying the source (414) (i.e., the client(s) from which the requests should be accepted), as well as protocol (416) and port (418) (e.g., protocol and port on which the server application accepts incoming requests). The security group 420 includes an outbound firewall rule 425 specifying the destination (242) (i.e., the server(s) to which the clients are allowed to communicate), as well as protocol (426) and port (428) (e.g., protocol on which the server application accepts incoming requests).

Then, as schematically shown by the dotted line 442, the security group 410 is specified as the destination for the outbound rule 425 of the security group 420, and thus all instances associated with the security group 410 become valid destinations for the outbound rule 425 of the security group 420. Conversely, as schematically shown by the dotted line 444, the security group 420 is specified as the source for the inbound rule 415 of the security group 410, thus all instances associated with the security group 420 become valid sources for the inbound rule 415 of the security group 410.

Thus, security groups 410 and 420 effectively segment the private subnet of the VPC into two logical segments interconnected via a virtual firewall, which implements the firewall rules 415, 425 associated with the security groups 410 and 420. Collectively, the two sets of rules allow any server instance to send requests to and receive responses from any client instance, while preventing any other communications within the VPC, as described herein above with reference to FIG. 3.

In an illustrative example, the server-side and client side-instances may reside within the same VPC. In another illustrative example, the server-side instances may reside within one VPC while client-side instances may reside within another VPC, provided that the two VPCs are connected by an active VPC peering connection.

While the foregoing description and examples reference two groups of instances, similar security policy may be similarly formulated for any number of functional groups of instances, such any instance of one functional group would be allowed to communicate to any instance of another functional group, while any other communications within the customer cloud encompassing one or more VPCs would be prevented by the firewall service.

While in the foregoing description and examples one security groups references another security group, in various other examples, a security group may reference multiple security groups. In one embodiment, the DSG of the example of FIG. 3 may reference multiple WSGs: $WSG_1, \ldots, WSG_N$ as the sources of the inbound firewall rules, and vice versa: the WSG of the example of FIG. 3 may reference multiple DSGs: $DSG_1, \ldots, DSG_N$ as the destinations of the outbound firewall rules. Thus, a security policy may specify multiple source and destination tags, and a security group is automatically created for each source or destination tag specified by the security policy.

In one embodiment, the firewall management service 150 of FIG. 1 may track the instances associated with active security groups, e.g., by receiving, from the cloud management service 110 of FIG. 1, notifications of instance creation or deletion. Responsive to determining that the last instance associated with a given security group has been deleted, the firewall management service may delete the security group. Similarly, in one embodiment, the firewall management service 150 of FIG. 1 may track the VPC peering connections associated with active security groups, e.g., by receiving, from the cloud management service 110 of FIG. 1, notifications of VPC peering connection creation or deletion. Responsive to determining that a VPC peering connection has been deleted, the firewall management service may delete the security groups that were created for enabling communications between the two VPCs that were connected by the VPC peering connection. Timely deletion of the unused security groups may prevent their potential misuse by a malicious third party that may attempt to masquerade an existing instance as an instance associated with an unused security group.

As noted herein above, the automatic creation of security groups relies upon security policies which identify the cloud resources (e.g., instances) by their respective tags, such as tags indicating the function, resource type, or application type. In one embodiment, the tag space may be divided into sub-domains, such that each sub-domain would be restricted to specific user roles. Introducing the tagging space sub-domains and limiting such sub-domains to specific user roles further enhances the security and scalability of virtual private clouds, since it restricts the users' ability to assign certain tags to resource clouds, while allowing highly-privileged users delegate certain tagging tasks to other users.

As schematically illustrated by FIG. 5, an example tagging policy 500, which maps tag domain identifiers 510 to user roles 520, may reserve a certain pre-defined tag name space 512 (e.g., fms-*, where '*' denotes any string of symbols) for the firewall management service (FMS) service-linked role 522. A service-linked role is a role that is associated with a specified cloud service and includes all the permissions that the service requires to call other cloud services. The set of permissions associated with a service-linked role cannot be associated with any other entity.

Another pre-defined tag name space 514 (e.g., fms-<account_id>—*, where <account_id> denotes an alphanumeric identifier of the customer's cloud account and '*' denotes any string of symbols) may be reserved for the users associated with the role of the FMS account administrator 524. Thus, each account administrator will be able to tag any cloud resource within their account, but only using the account domain tag. Additionally, FMS account administrators may be allowed to create FMS security policies and apply it to their account resources (i.e., resources within the same VPC or resources within multiple VPCs associated with the same account).

Another pre-defined tag name space 516 (e.g., fms-<organization_unit_id>-<account_id>-*, where <organization_unit_id> denotes an alphanumeric identifier of the customer's organizational unit (representing a business unit of the customer's organization), <account_id> denotes an alphanumeric identifier of the customer's cloud account, and '*' denotes any string of symbols) may be reserved for the users associated with the role of the organizational unit administrator 526. An organizational unit may be associated with one or more customer cloud accounts. Thus, each organizational unit administrator will be able to tag any cloud resource within their account(s), but only using the organizational unit domain tag. Additionally, the organizational unit administrator may be allowed to create FMS security policies and apply it to their organizational unit resources (i.e., resources within multiple VPCs associated with the same organizational unit).

Another pre-defined tag name space 518 (e.g., fms-<organization_id>—*, where <organization_id> denotes an alphanumeric identifier of the customer's organization and '*' denotes any string of symbols) may be reserved for the users associated with the role of the organization administrator 528. Thus, each organization administrator will be able to tag any cloud resource within their accounts, but only using the organization domain tag. Additionally, the organization administrator may be allowed to create FMS security policies and apply it to their organization resources (including the resources within multiple VPCs within different organizational units or different organizations). Other types of resources (such as resources within the same VPC or resources within multiple VPCs associated with the same account or with the same organizational unit) may be covered by lower-level administrators.

In one embodiment, the administrator of the first organization (org_id1) may assign tags (e.g., from the tag domain fms-<organization_id1>-*) to resources associated with one or more accounts of with the first organization, while the administrator of the second organization (org_id2) may assign tags (e.g., from the tag domain fms-<organization_id2>—*) to resources associated with one or more accounts of the second organization. This tagging scheme may be utilized for automatically generating security groups for instances that belong to different VPCs in different organizations, since each organization administrator would only be able to tag instances using the tag domain associated with the respective organization.

The above-described and/or other tagging policies may be applied to the methods of security group generation, thus further enhancing the security and scalability of virtual private clouds, by restricting the users' ability to assign tags in certain tag domains to cloud resources, while allowing high-privileged users delegate certain tagging tasks to other users.

Figure 6:
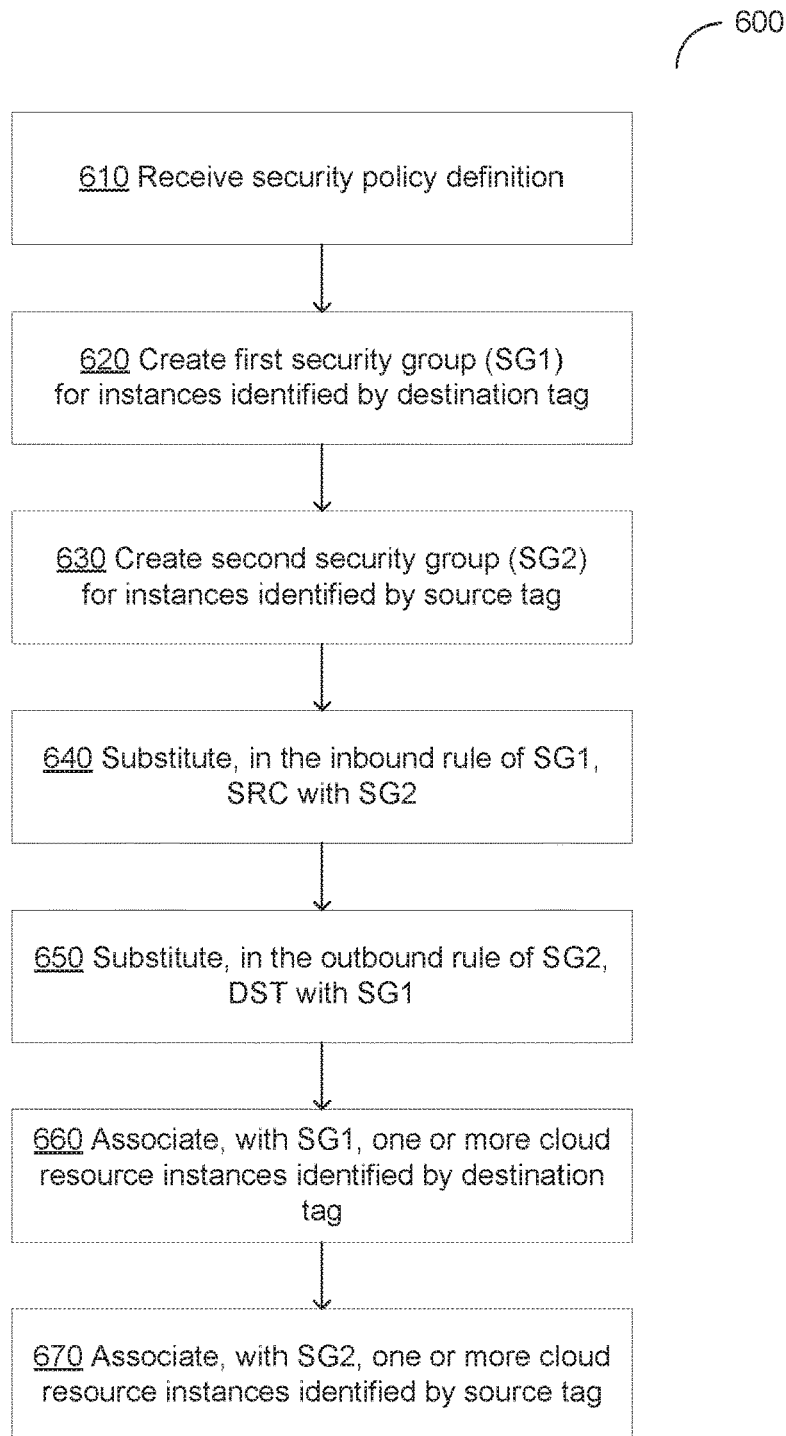
FIG. 6 is a flow diagram of one embodiment of a method implemented by the firewall management service for automatic generation of security groups.

FIG. 6 is a flow diagram of one embodiment of a method implemented by the firewall management service for automatic generation of security groups. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computing device 700 of FIG. 7) implementing the method. In one embodiment, method 600 may be performed by a single processing thread. Alternatively, method 600 may be performed by two or more processing threads, each thread implementing one or more individual functions, routines, subroutines, or operations of the method. In one embodiment, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various embodiments of the method may perform at least some of the described operations in parallel or in arbitrary selected orders. In one embodiment, method 600 may be implemented by the firewall management service 160 of FIG. 1.

Referring to FIG. 6, at block 610, the firewall management service implementing the method may receive (e.g., via an API or a GUI) definition of a security policy allowing cloud resource instances labeled by a destination tag to service requests initiated by cloud resource instances labeled by a source tag. In an illustrative example, the destination tag may be utilized for identifying server-side cloud resource instances (e.g., database servers), while the destination tag may be utilized for identifying client-side cloud resource instances (e.g., web servers), as described in more detail herein above.

At block 620, the firewall management service may create a first security group to be associated with for the cloud resource instances labeled by the destination tag. The security group definition may include an inbound firewall rule specifying a source communication endpoint identifier, a transport layer protocol identifier, and a port identifier, as described in more detail herein above.

At block 630, the firewall management service may create a second security group to be associated with for the cloud resource instances labeled by the source tag. The security group definition may include an outbound firewall rule specifying a destination communication endpoint identifier, a transport layer protocol identifier, and a port identifier, as described in more detail herein above.

At block 640, the firewall management service may substitute, in the inbound firewall rule associated with the first security group, the source communication endpoint identifier with the identifier of the second security group.

At block 650, the firewall management service may substitute, in the outbound firewall rule associated with the second security group, the destination communication endpoint identifier with the identifier of the first security group.

At block 660, the firewall management service may associate, with the first security group, one or more cloud resource instances labeled by the destination tag. In an illustrative example, responsive to receiving a notification of creation of a cloud resource instance labeled by the destination tag, the firewall management service may associate the newly created cloud resource instance with the first security group, as described in more detail herein above.

At block 670, the firewall management service may associate, with the second security group, one or more cloud resource instances labeled by the source tag. In an illustrative example, responsive to receiving a notification of creation of a cloud resource instance labeled by the source tag, the firewall management service may associate the newly created cloud resource instance with the second security group, as described in more detail herein above, and the method may terminate.

Figure 7:
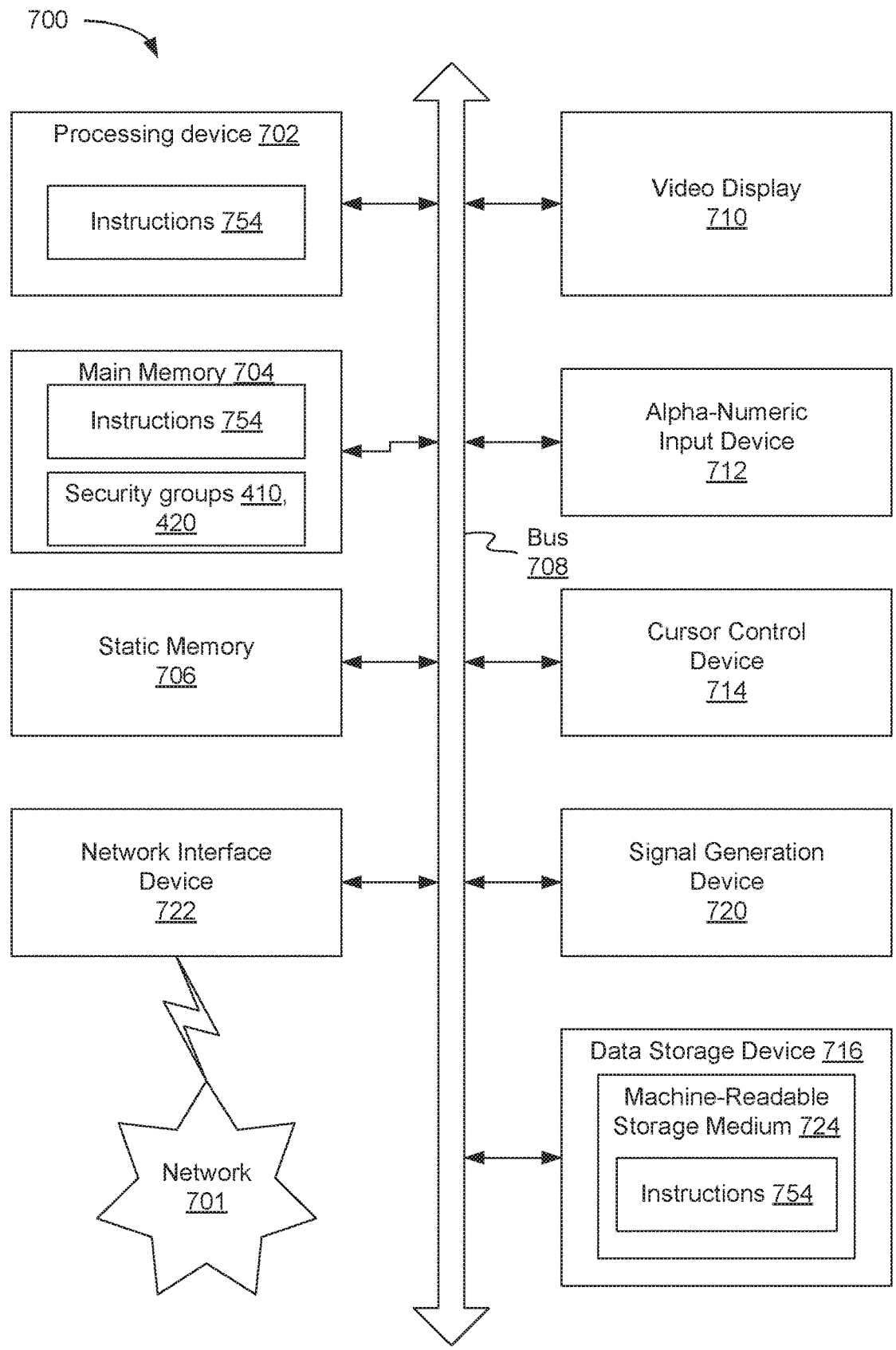
FIG. 7 illustrates a diagrammatic representation of a machine in the exemplary form of a computer system within which a set of instructions, for causing the machine to perform any one or more of the methods discussed herein, may be executed in one embodiment.

FIG. 7 illustrates a diagrammatic representation of a machine in the exemplary form of a computer system within which a set of instructions, for causing the machine to perform any one or more of the methods discussed herein, may be executed in one embodiment. A set of instructions for causing the computing device 700 to perform any one or more of the methods discussed herein may be executed by the computing device 700. In one embodiment, the computing device 700 may implement the functions of the firewall management service 150 of FIG. 1.

In one embodiment, the computing device 700 may be connected to other computing devices by a network 701 provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computing device" shall also be taken to include any collection of machines (e.g., computers) that individually or jointly execute a set (or multiple sets) of instructions to perform any one or more of the methodologies discussed herein.

In one embodiment, the computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.) and a data storage device 716, which communicate with each other via a bus 708.

In one embodiment, the processing device 702 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor or the like.

In one embodiment, the computing device 700 may further include one or more network interface devices 722. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker).

In one embodiment, the data storage device 718 may include a computer-readable storage medium 724 on which is stored one or more sets of instructions 754 embodying any one or more of the methods or functions described herein. The instructions 754 may also reside, completely or at least partially, within the main memory 704 and/or within the processing device 702 during execution thereof by the computing device 700; the main memory 704 and the processing device 702 also constituting machine-readable storage media.

While the computer-readable storage medium 724 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The main memory 704 may be further employed for storing various data structures utilized by the systems and methods described herein. In one embodiment, the main memory 704 may store the generated security groups (e.g., security groups 410 and 420 of FIG. 4).

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
    identifying a first set of cloud resource instances interconnected, by a private network, with a second set of cloud resource instances;
    identifying a first security group comprising an inbound firewall rule for the first set of cloud resource instances, wherein the inbound firewall rule comprises a source communication endpoint identifier provided by an identifier of a second security group;
    identifying the second security group comprising an outbound firewall rule for the second set of cloud resource instances, wherein the outbound firewall rule comprises a destination communication endpoint identifier provided by an identifier of the first security group;
    preventing association of the first security group and the second security group with other cloud resource instances; and
    partitioning the private network into a first logical network defined by the first security group and a second logical network defined by the second security group.

2. The method of claim 1, further comprising:
    associating, with the first security group, a first cloud resource instance labeled by a first tag specifying at least one of: a cloud resource function, a cloud resource type, or an application type.

3. The method of claim 1, further comprising:
    receiving, from a cloud management service, a notification of deletion of a first cloud resource instance associated with the first security group;
    determining that no active cloud resource instances remain associated with the first security group; and
    deleting the first security group.

4. The method of claim 1, wherein a first cloud resource instance associated with the first security group runs within a first virtual private cloud and a second cloud resource instance associated with the second security group runs within a second virtual private cloud, the method further comprising:
    receiving, from a cloud management service, a notification of deletion of a link between the first virtual private cloud and the second virtual private cloud;
    deleting the first security group; and
    deleting the second security group.

5. The method of claim 1, further comprising:
    receiving, from a cloud management service, a notification of activation of a first cloud resource instance labeled by a first tag; and
    associating the first cloud resource instance with the first security group.

6. The method of claim 1, further comprising:
    applying the first security group based on a security policy definition allowing cloud resource instances labeled by a first tag to communicate to cloud resource instances labeled by a second tag.

7. The method of claim 6, wherein the first tag is associated with a tag domain restricted to a specific user role.

8. The method of claim 6, wherein the first tag is associated with a first tag domain of a tag space, wherein the tag space comprises the first tag domain and a second tag domain, wherein the first tag domain is associated with a first user role and the second tag domain is associated with a second user role.

9. A computer system, comprising:
    a memory; and
    a processing device operatively coupled to the memory, the processing device to:
        identify a first set of cloud resource instances interconnected, by a private network, with a second set of cloud resource instances;
        identify a first security group comprising an inbound firewall rule for the first set of cloud resource instances, wherein the inbound firewall rule comprises a source communication endpoint identifier provided by an identifier of a second security group;
        identify the second security group comprising an outbound firewall rule for the second set of cloud resource instances, wherein the outbound firewall rule comprises a destination communication endpoint identifier provided by an identifier of the first security group;

prevent association of the first security group and the second security group with other cloud resource instances; and partition the private network into a first logical network defined by the first security group and a second logical network defined by the second security group.

10. The computer system of claim 9, wherein the processing device is further to:

associate, with the first security group, a first cloud resource instance labeled by a first tag specifying at least one of: a cloud resource function, a cloud resource type, or an application type.

11. The computer system of claim 9, wherein the processing device is further to:

receive, from a cloud management service, a notification of deletion of a first cloud resource instance associated with the first security group;

determine that no active cloud resource instances remain associated with the first security group; and delete the first security group.

12. The computer system of claim 9, wherein a first cloud resource instance associated with the first security group runs within a first virtual private cloud and a second cloud resource instance associated with the second security group runs within a second virtual private cloud, wherein the processing device is further to:

receive, from a cloud management service, a notification of deletion of a link between the first virtual private cloud and the second virtual private cloud;

delete the first security group; and delete the second security group.

13. The computer system of claim 9, wherein the processing device is further to:

receive, from a cloud management service, a notification of activation of a first cloud resource instance labeled by a first tag; and associate the first cloud resource instance with the first security group.

14. The computer system of claim 9, wherein the processing device is further to:

apply the first security group based on a security policy definition allowing cloud resource instances labeled by a first tag to communicate to cloud resource instances labeled by a second tag.

15. A non-transitory computer-readable storage medium comprising executable instructions that, when executed by a processing device, cause the processing device to:

identify a first set of cloud resource instances interconnected, by a private network, with a second set of cloud resource instances;

identify a first security group comprising an inbound firewall rule for the first set of cloud resource instances, wherein the inbound firewall rule comprises a source communication endpoint identifier provided by an identifier of a second security group;

identify the second security group comprising an outbound firewall rule for the second set of cloud resource instances, wherein the outbound firewall rule comprises a destination communication endpoint identifier provided by an identifier of the first security group;

prevent association of the first security group and the second security group with other cloud resource instances; and partition the private network into a first logical network defined by the first security group and a second logical network defined by the second security group.

16. The non-transitory computer-readable storage medium of claim 15, further comprising executable instructions that, when executed by the processing device, cause the processing device to:

associate, with the first security group, a first cloud resource instance labeled by a first tag specifying at least one of: a cloud resource function, a cloud resource type, or an application type.

17. The non-transitory computer-readable storage medium of claim 15, further comprising executable instructions that, when executed by the processing device, cause the processing device to:

receive, from a cloud management service, a notification of deletion of a first cloud resource instance associated with the first security group;

determine that no active cloud resource instances remain associated with the first security group; and delete the first security group.

18. The non-transitory computer-readable storage medium of claim 15, wherein a first cloud resource instance associated with the first security group runs within a first virtual private cloud and a second cloud resource instance associated with the second security group runs within a second virtual private cloud, the non-transitory computer-readable storage medium further comprising executable instructions that, when executed by the processing device, cause the processing device to:

receive, from a cloud management service, a notification of deletion of a link between the first virtual private cloud and the second virtual private cloud;

delete the first security group; and delete the second security group.

19. The non-transitory computer-readable storage medium of claim 15, further comprising executable instructions that, when executed by the processing device, cause the processing device to:

receive, from a cloud management service, a notification of activation of a first cloud resource instance labeled by a first tag; and associate the first cloud resource instance with the first security group.

20. The non-transitory computer-readable storage medium of claim 15, further comprising executable instructions that, when executed by the processing device, cause the processing device to:

apply the first security group based on a security policy definition allowing cloud resource instances labeled by a first tag to communicate to cloud resource instances labeled by a second tag.

* * * * *